(12) United States Patent
Knoll et al.

(10) Patent No.: US 7,264,718 B2
(45) Date of Patent: *Sep. 4, 2007

(54) FLUID FILTER APPARATUS AND METHOD

(75) Inventors: George Knoll, Belvidere, IL (US); Michael Chou, Tai Chung (TW)

(73) Assignee: Natural Choice Corporation, Belvidere, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/283,980

(22) Filed: Nov. 21, 2005

(65) Prior Publication Data

US 2006/0091055 A1    May 4, 2006

Related U.S. Application Data

(63) Continuation of application No. 10/812,600, filed on Mar. 30, 2004, now Pat. No. 6,977,039.

(51) Int. Cl.
*B01D 35/153* (2006.01)
*B01D 35/157* (2006.01)

(52) U.S. Cl. .................. 210/232; 210/234; 210/235; 210/444; 210/450; 210/542

(58) Field of Classification Search .............. 210/232, 210/234, 235, 444, 450, 542
See application file for complete search history.

(56) References Cited

U.S. PATENT DOCUMENTS

| | | |
|---|---|---|
| 3,700,214 A | 10/1972 | MacManus |
| 3,746,171 A | 7/1973 | Thomsen |
| 3,758,080 A | 9/1973 | MacManus |
| 3,810,415 A | 5/1974 | MacManus |
| 4,654,142 A | 3/1987 | Thomsen et al. |
| 4,735,716 A | 4/1988 | Petrucci et al. |
| 4,877,521 A | 10/1989 | Petrucci et al. |
| 4,915,831 A | 4/1990 | Taylor |
| 4,948,505 A | 8/1990 | Petrucci et al. |
| D321,394 S | 11/1991 | Petrucci et al. |
| D322,836 S | 12/1991 | Petrucci et al. |
| 5,336,406 A | 8/1994 | Stanford et al. |
| 5,486,288 A | 1/1996 | Stanford et al. |
| 5,510,060 A | 4/1996 | Knoll |
| 5,591,332 A | 1/1997 | Reid et al. |
| 5,725,621 A | 3/1998 | Pruette et al. |
| 5,744,030 A | 4/1998 | Reid et al. |
| 5,753,107 A | 5/1998 | Magnusson et al. |

(Continued)

*Primary Examiner*—Thomas M. Lithgow
(74) *Attorney, Agent, or Firm*—Husch & Eppenberger LLC; Robert C. Haldiman

(57) ABSTRACT

A fluid filter system has a manifold having a fluid inlet with an inlet stop and a fluid outlet with an outlet stop and a cartridge seat. A cartridge is separable from the manifold and adapted to mount and dismount in the manifold. The cartridge has a filter housing containing a filter for filtering fluid, and an integral closure member having a first level and a second level. A radial inlet port is on a face of the first level of the closure member and an axial outlet port is on top of the second level of the closure member. A first boss on the closure member opens the inlet stop when the cartridge is mounted in the manifold. A second boss on the closure member is disposed to open the outlet stop when the cartridge is mounted in the manifold. The bosses engage the stops sequentially.

16 Claims, 16 Drawing Sheets

U.S. PATENT DOCUMENTS

| | | |
|---|---|---|
| 5,826,854 A | 10/1998 | Janvrin et al. |
| 5,925,245 A | 7/1999 | Bradford et al. |
| 6,027,644 A | 2/2000 | Magnusson et al. |
| D433,094 S | 10/2000 | Magnusson et al. |
| 6,193,884 B1 | 2/2001 | Magnusson et al. |
| D455,814 S | 4/2002 | Magnusson et al. |
| 6,458,269 B1 * | 10/2002 | Bassett et al. ............... 210/119 |
| D472,299 S | 3/2003 | Fritze |
| D472,604 S | 4/2003 | Fritze |

\* cited by examiner

24

FLUID FILTER APPARATUS AND METHOD

CROSS-REFERENCE TO RELATED APPLICATIONS

This application is a continuation of U.S. patent application Ser. No. 10/812,600 filed on Mar. 30, 2004 now U.S. Pat No. 6,977,039.

BACKGROUND OF THE INVENTION

1. Field of the Invention

The present invention is a fluid filter cartridge, manifold and method for their assembly and for replacing cartridges.

2. Related Art

Fluid filters, particularly water filters, are known. Drinking water filters adapted for use with plumbing in buildings where people work or live is common in many areas. A variety of filter types can be used, including charcoal, other granular types of filters or pleated membranes and the like. After any filter has been used for a period of time, it becomes less effective as impurities build up within it. Accordingly, filter systems need to provide for filter replacement.

U.S. Pat. No. 5,336,406 to Stanford et al. is typical of a prior art filter system having a replaceable cartridge. One problem addressed by the Stanford patent is to prevent leakage of water during the replacement of a filter and/or a cartridge containing the filter. The Stanford reference discloses a spring loaded check valve for closing a water source pipe when a cartridge is removed from a manifold that holds it when in use. However, the prior art leaves unaddressed multiple continuing problems. For example, in the Stanford patent, only the water intake is stopped by the valve during replacement. There is a need in the art for stopping not only pressurized water inflow during cartridge replacement but also back flow from the water outlet side of the manifold.

Another continuing need in the art is protecting filter components from damage or misalignment during installation. For example, the filters themselves within cartridges typically have an outlet tube or other extension designed to engage an outlet in the manifold. Filters, filter outlet tubes, seals, o-rings and the like can all be damaged or misaligned during installation when prior art designs are used. There is a continuing need in the art for a more durable design for a cartridge closure member and its seating within a manifold receptacle for it.

Leakage of fluid during cartridge replacement is increased by the failure of the prior art designs to relieve input fluid pressure on closure components during cartridge replacement, particularly in relation to outflow pressure release. Leakage would be reduced and water pressure shock to a new filter is also reduced by providing pressure release through a fluid outlet sequentially with re-pressurization through a fluid inlet. However, no existing system achieves this.

There also remains a continuing need to avoid further damage or misalignment by a users repeated manual adjustment of the cartridge within the manifold caused by the users inability to determine when a cartridge closure member has been properly seated in the manifold. There further remains a need for an ergonomically designed cartridge having a shape making it intuitively clear to a user how a cartridge properly seats in a manifold.

There is also a need in the art for allowing a user the option of replacing an entire cartridge, or simply a filter within the cartridge.

There is a continuing need in the art for a manifold and cartridge assembly easily assembled with existing plumbing, as for example, with manifold inlet and outlets being in line.

There are also continuing fluid flow optimization needs in the art. Designing the cartridge and filter assembly so that the intake of pressurized water does not misalign a filter within the cartridge, and so that distribution of incoming water to be filtered around all surfaces of the filter, in order to maximize its efficiency, is maintained.

SUMMARY OF THE INVENTION

It is in view of the above problems that the present invention was developed. The present invention is a water filter system, apparatus and method having a manifold designed for installation with a pressurized fluid input pipe and an outlet pipe. The present invention includes a manifold and a replaceable cartridge. The cartridge is comprised of a housing dimensioned to contain a filter. The housing may have a base end that is removable, or fixed to the housing. The cartridge having a removable base, a filter may be replaced in the cartridge and the cartridge reused. The alternative design not having a removable base, the cartridge may be removed and replaced from the manifold of the filter system, but the filter may not be replaced within the cartridge housing. In either case, any of a wide variety of known filters may be installed within the housing of the cartridge.

The cartridge also includes a closure member. The closure member is integrally formed with the filter housing. The housing, in some aspects of the present invention, may be tapered, to ease proper installation.

The manifold, in one embodiment of the present invention, is designed for inline installation on a preexisting plumbing line. That is, the input and output pipes would be substantially level. The manifold has an inlet stop and outlet stop. The stops may be any of a wide variety of stop valves, check valves or other devices for leakage free closure of a fluid transport line. The manifold inlet and manifold outlet are in fluid communication with seats for the cartridge closure member. The stops for the inlet and outlet are incorporated with the inlet and outlet such that an actuating projection of the stops extends into the seat for the closure member.

Both the convex extension of the closure member and the corresponding concave seat of the manifold are designed with two levels. The radial dimensions of each level are different. In the depicted embodiments, each level has an annular axial face, having an annular seat for an O-ring to seal the closure member in the manifold seat. A second level of the closure member is coaxial with and disposed on the top of the first level. It also has an annular seat for an O-ring. The first level includes radial intake ports for receiving pressurized input of water or other fluids. The intake ports are on the vertical, annular side wall of the first level. The top level has an outlet port, located on its top, so that fluid outlet is in an axial direction.

Each level of the closure member also includes at least one boss or tab. This boss or tab has at least one ramped face in the depicted embodiments. The bosses are fabricated and oriented to engage the inlet and outlet stop projections when the cartridge is installed in the manifold seat. The bosses are further fabricated and oriented in relation to one another so that upon installation, the outlet stop is engaged to open first and the inlet stop is engaged to open last. Thus, on installation, the outlet valve is already open when the inlet valve is opened avoiding pressure shocks to the filter alignment and avoiding leakage. The order is reversed when the cartridge is being removed. The bosses close the fluid intake stop valve first, and close the fluid outlet stop second, also suppressing leakage and discontinuous pressure transitions.

The inlet ports on the cartridge are larger than the outlet port in total intake area and volume capacity. The inlet ports may be two or more in number, or may be a single large port. In the depicted embodiment, two ports are used. These configurations ensure that fluid taken in is evenly distributed around a filter within the filter housing.

Separately from the stop valve actuation bosses, the closure member and manifold further have ramped lugs dimensioned to cooperate with each other. These mounting lugs thread together to provide for a 90° turn screw fit. The inlet ports, stop valve bosses and mounting lugs are oriented symmetrically, so that a single, simple twisting motion will mount the cartridge in the manifold. Another boss and detent on the ramped lugs provide a positive stop, imparting a desirable "snap" sensation to a user, confirming proper installation.

Further features and advantages of the present invention, as well as the structure and operation of various embodiments of the present invention, are described in detail below with reference to the accompanying drawings.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

The accompanying drawings, which are incorporated in and form a part of the specification, illustrate the embodiments of the present invention and together with the description, serve to explain the principles of the invention. In the drawings.

DETAILED DESCRIPTION OF THE PREFERRED EMBODIMENTS

The following description of the preferred embodiment(s) is merely exemplary in nature and is in no way intended to limit the invention, its application, or uses.

Figure 1:
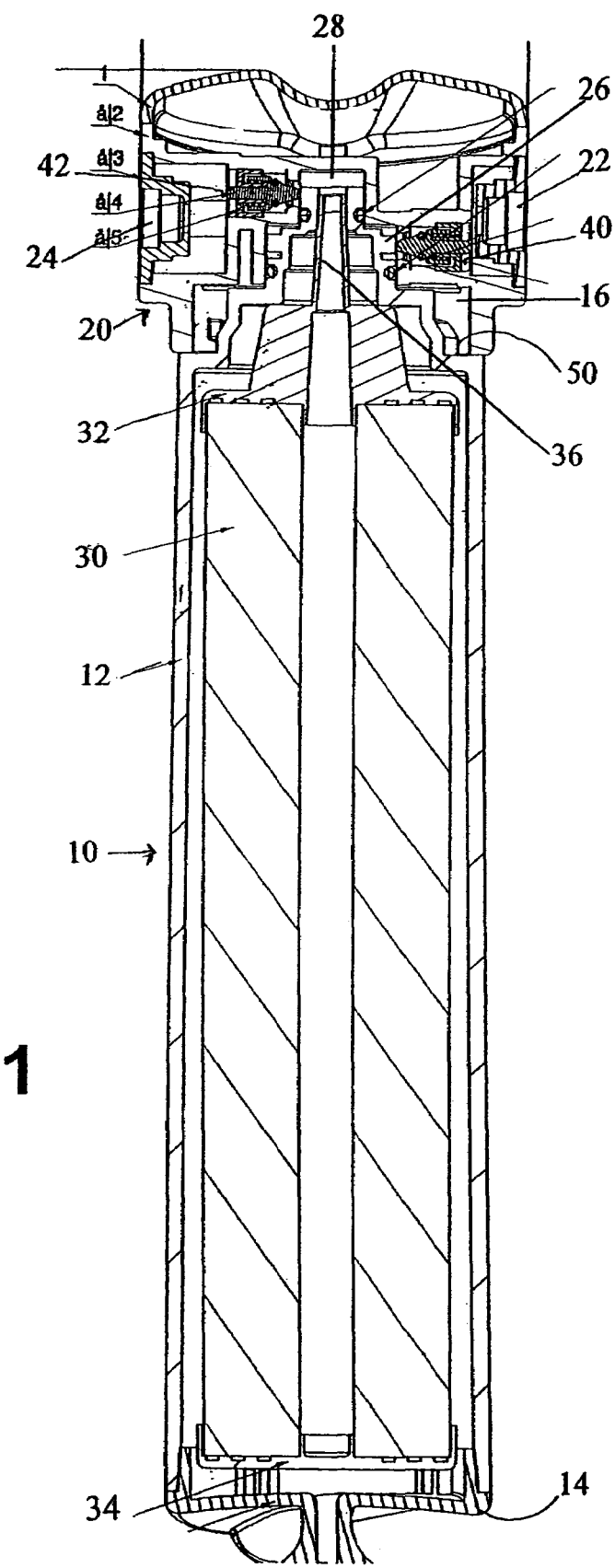
FIG. 1 is a cutaway front view of the manifold cartridge assembly of the present invention.
Figure 2:
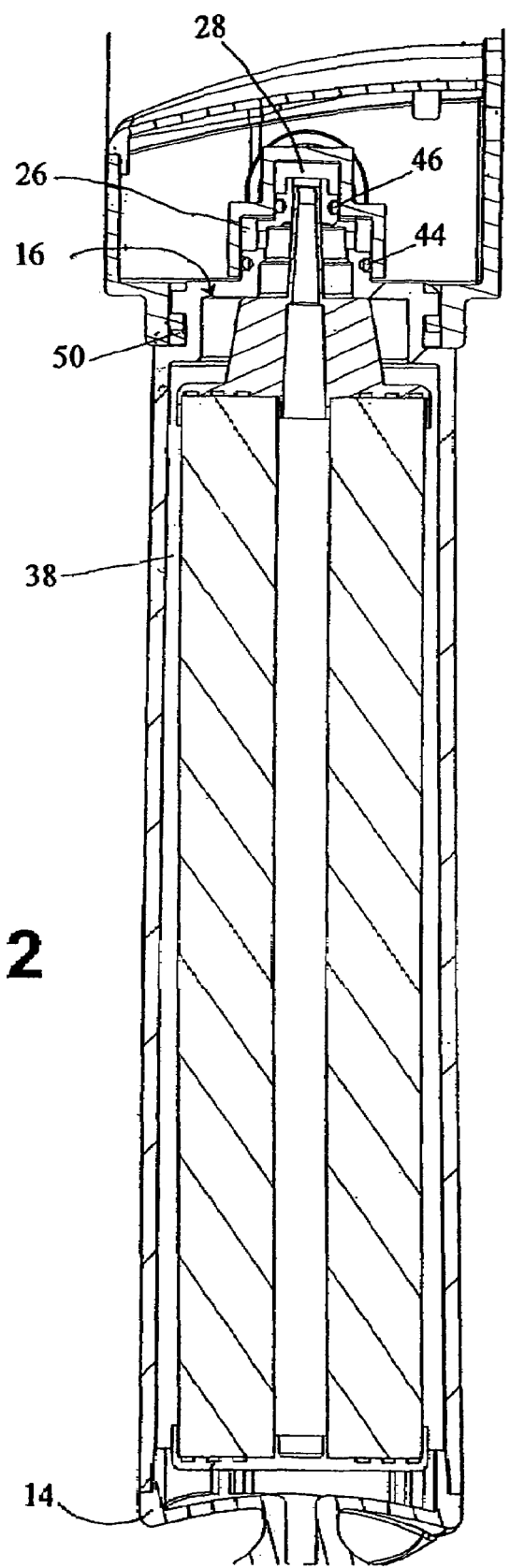
FIG. 2 is a cutaway side view of the manifold cartridge assembly of the present invention.

Referring to the accompanying drawings in which like reference numbers refer to like elements, FIG. 1 is a cutaway front view of the fluid filter manifold and cartridge assembly of the present invention. FIG. 2 is a cutaway side view of the same. Cartridge 10 is depicted as installed in manifold 20. The aspects of cartridge 10 include housing 12 base 14 and a closure member, indicated generally at 16.

Manifold 20 includes a fluid intake 22 and a fluid output 24. Intake 22 and output 24 are adapted to be installed with standard plumbing fittings in manners that will be recognized by those with skill in the art. Within manifold 20 are a first seat level 26 and second seat level 28.

Inside the housing 12 are a filter 30 assembled with a filter end cap 32 and filter base 34. The filter end cap 32 has a projecting filter output tube 36. In the depicted embodiment, a space 38 is provided between housing wall 12 and filter 30 for water flow. It is within the scope of the present invention that water flow filter and housing interior configurations within housing 12 may be varied.

Visible in FIG. 1 is an intake stop valve 40 and output stop valve 42. It is within the scope of the present invention that a variety of displaceable, fluid tight stops may be used. In the depicted embodiment, the stops are biased into a seat by springs and have O-rings seals, as described in more detail below.

Also visible in FIGS. 1 and 2 are O-rings seals for assembly in annular grooves in the closure member. They are disposed to sealingly engage the manifold first seat level 26 and second seat level 28 when cartridge 10 is fully installed in manifold 20. First O-ring 44 and second O-ring 46 seat in and seal the first level seat 26 and second level seat 28, respectively, when cartridge 12 is fully installed in manifold 20. Moreover, the seals and bosses of the closure member are dimensioned to seal before the bosses open the intake and output stops.

Figure 3:
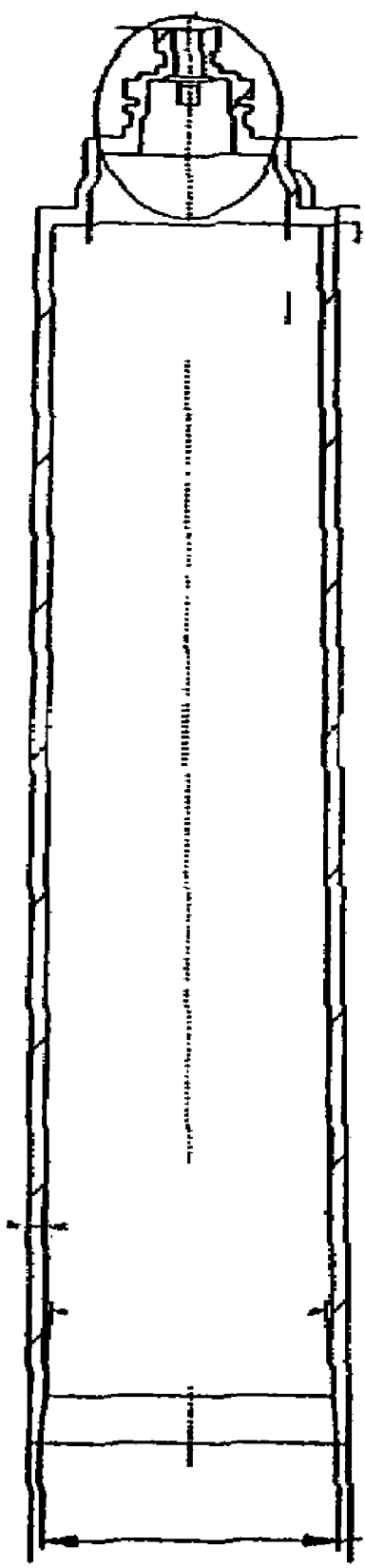
FIG. 3 is a cutaway front view of the cartridge of the present invention.
Figure 4:
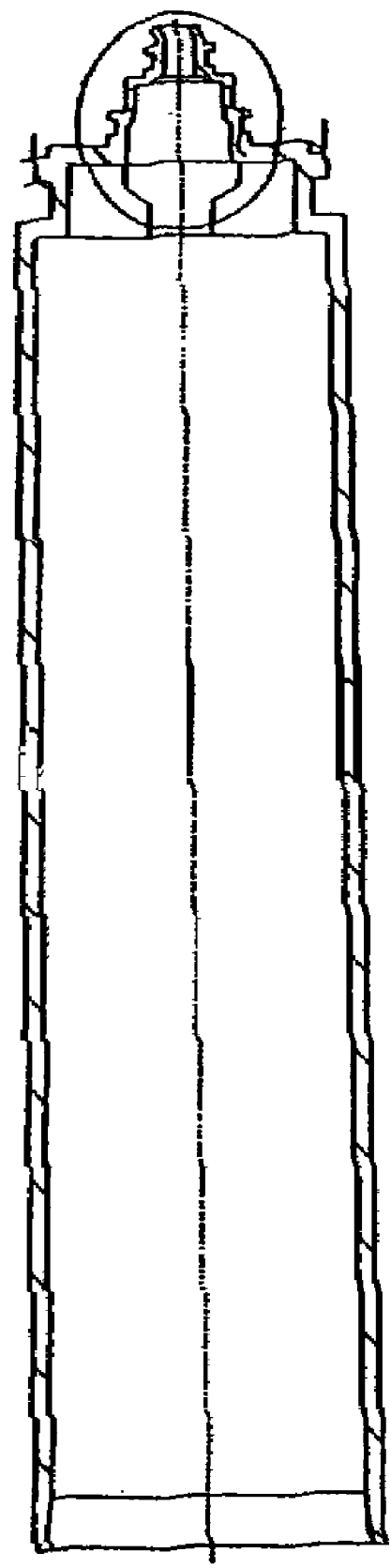
FIG. 4 is a cutaway side view of the cartridge of the present invention.
Figure 5:
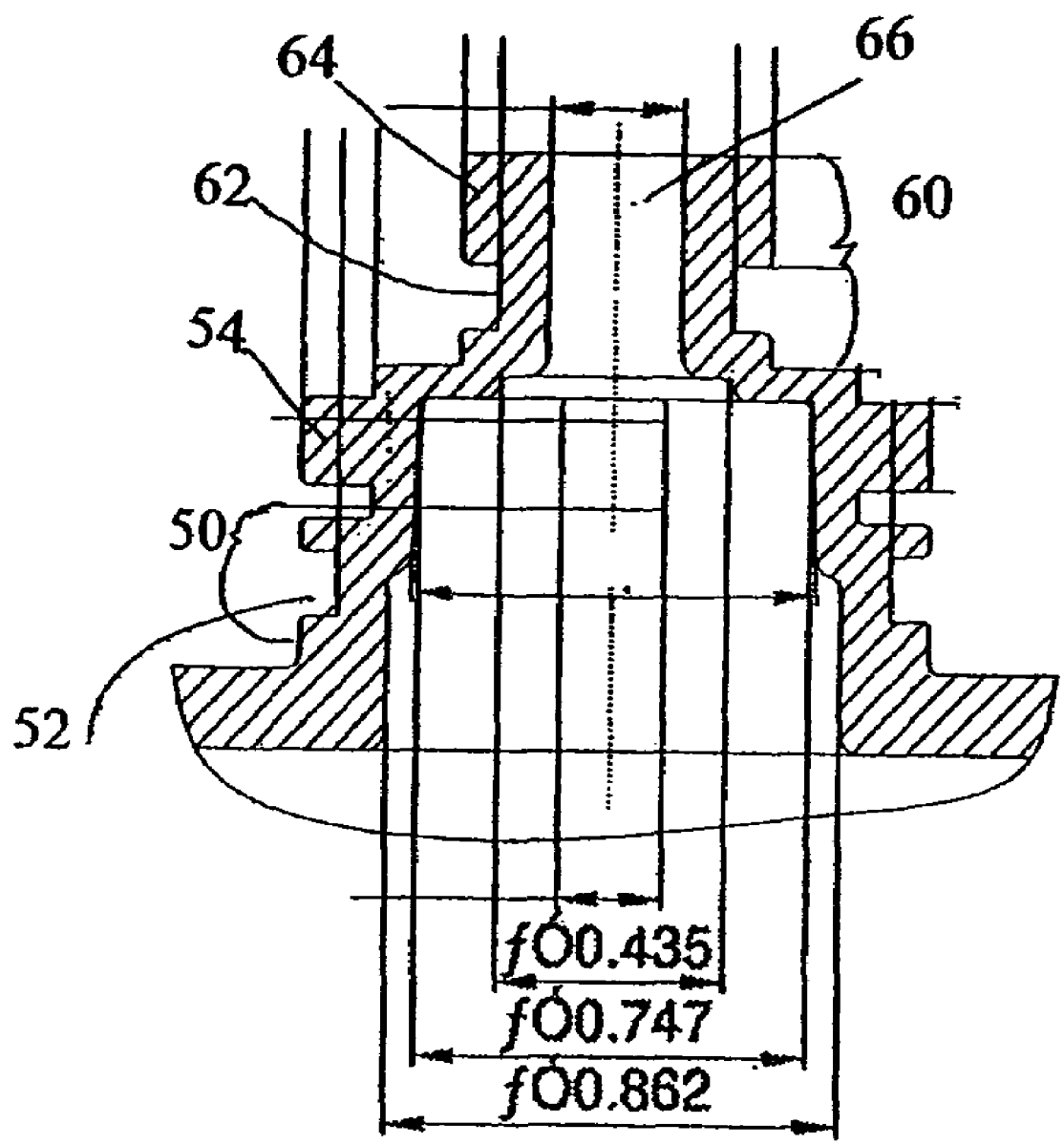
FIG. 5 is a cutaway close up front view of the closure member of the present invention.
Figure 6:
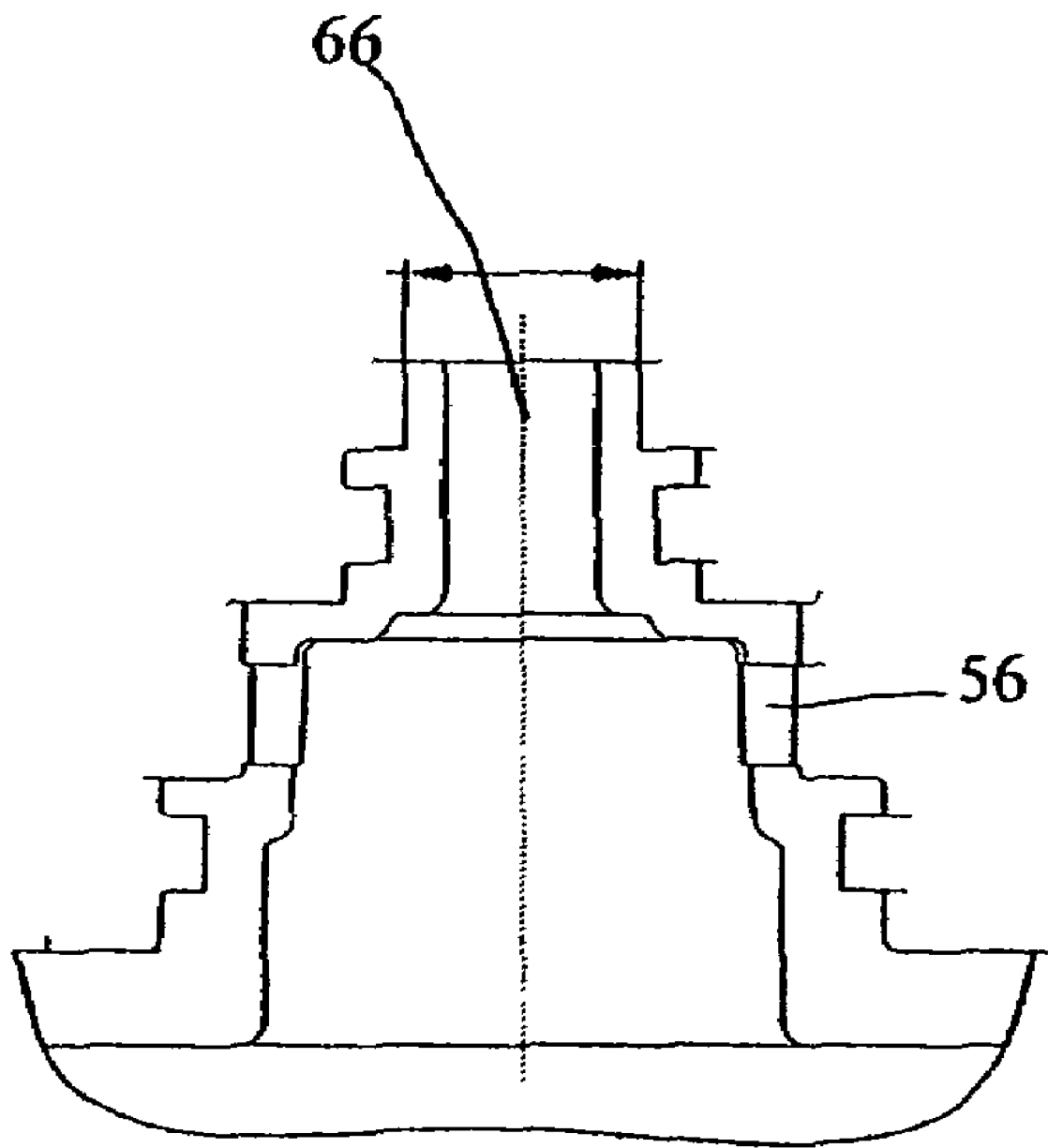
FIG. 6 is a cutaway close up side view of the closure member of the present invention.
Figure 9:
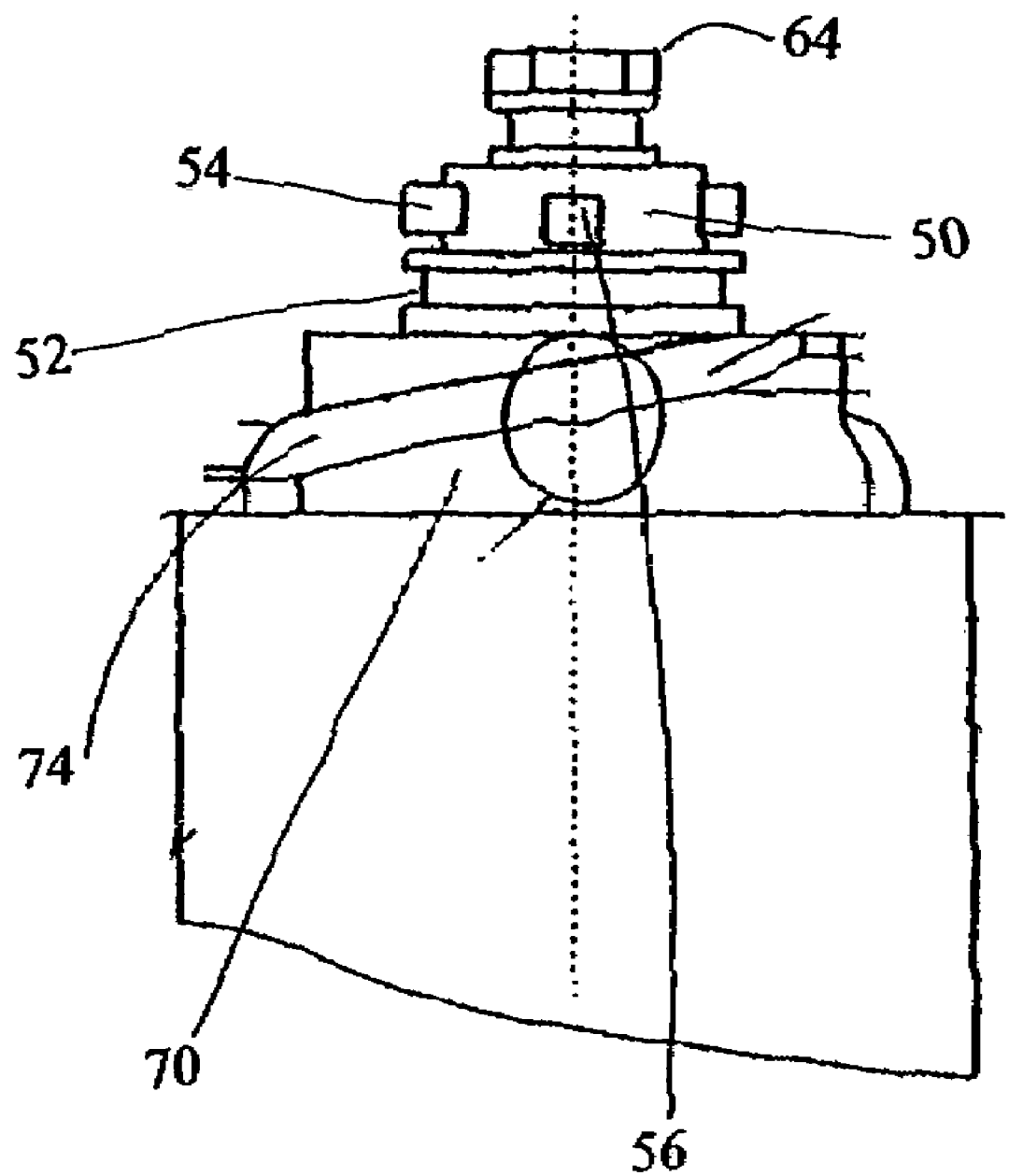
FIG. 9 is a front view of the closure member of the cartridge.

FIGS. 3 and 4 are a cutaway front view and side view, respectively, of the filter cartridge 10 without the filter 30 or the manifold 20 depicted. FIGS. 5 and 6 are a cutaway front view and cutaway side view, respectively, depicting a close up of the closure member that together with the housing comprise the cartridge 20. The closing member and housing may be attached, as by spin welding, or integrally formed. FIG. 9 is a front view of the closure member of the cartridge. As is best seen in FIGS. 5 and 9, the closure member has a first level 50 including an O-ring seat 52 and opposing bosses 54. Also on first level 50 of the closure member is a fluid intake port 56. As can be seen, the fluid intake port 56 is oriented in a lateral direction, opening radially through the vertical, annular wall of the first level 50 of the closure member. Also shown on FIG. 9 is a mounting level 70 of the closure member.

Also visible in FIGS. 5 and 9 is an upper level 60 of the closure member. Included in the upper level is annular O-ring seat 62 and opposing bosses 64. A fluid outflow port 66, for exit of the filtered fluid is also depicted in FIGS. 5 and 6. Outflow port 66 is on top of upper level 60 and fluid flows out of the cartridge axially.

Figure 7:
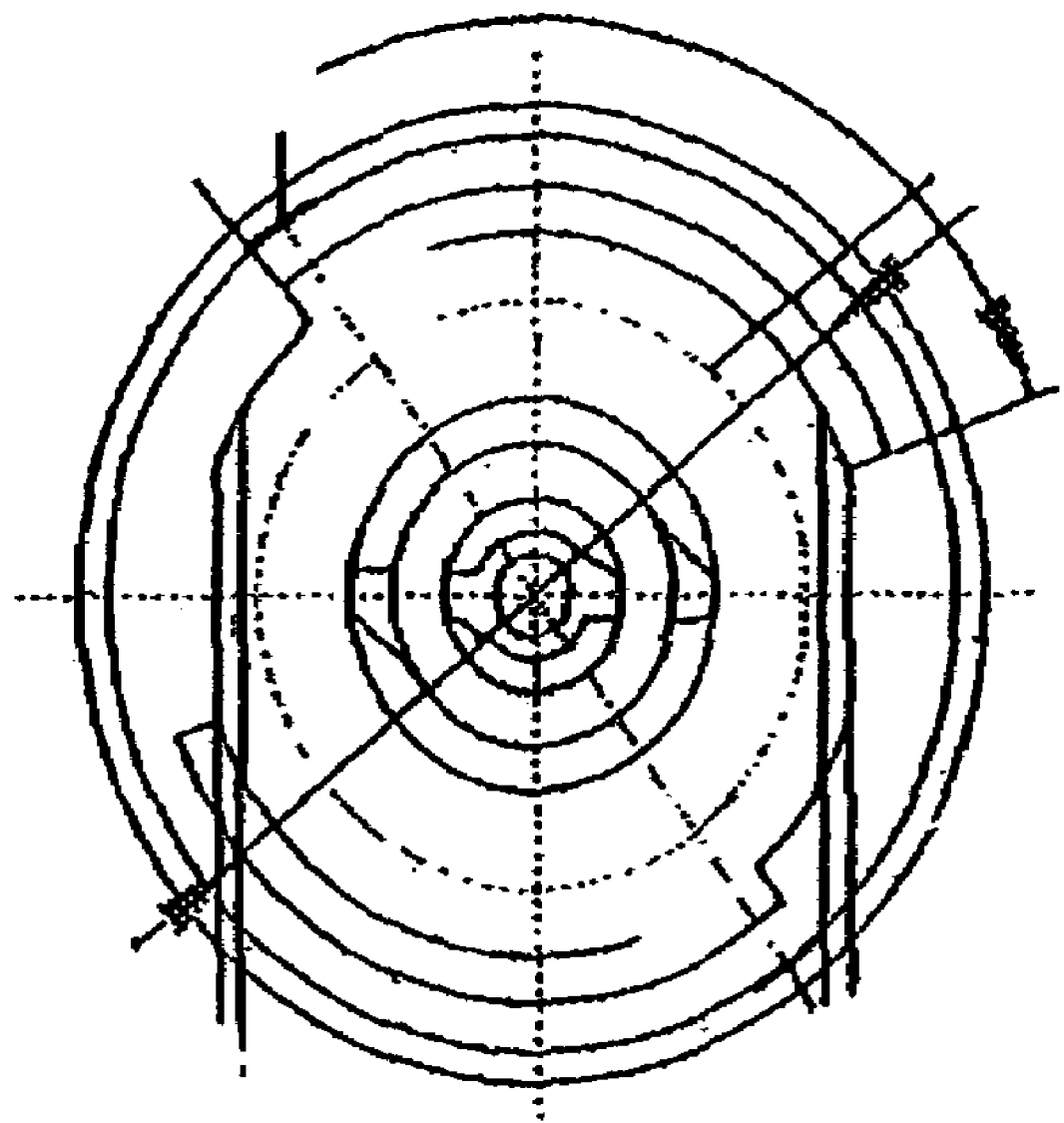
FIG. 7 is a top view of the cartridge of the present invention.
Figure 8:
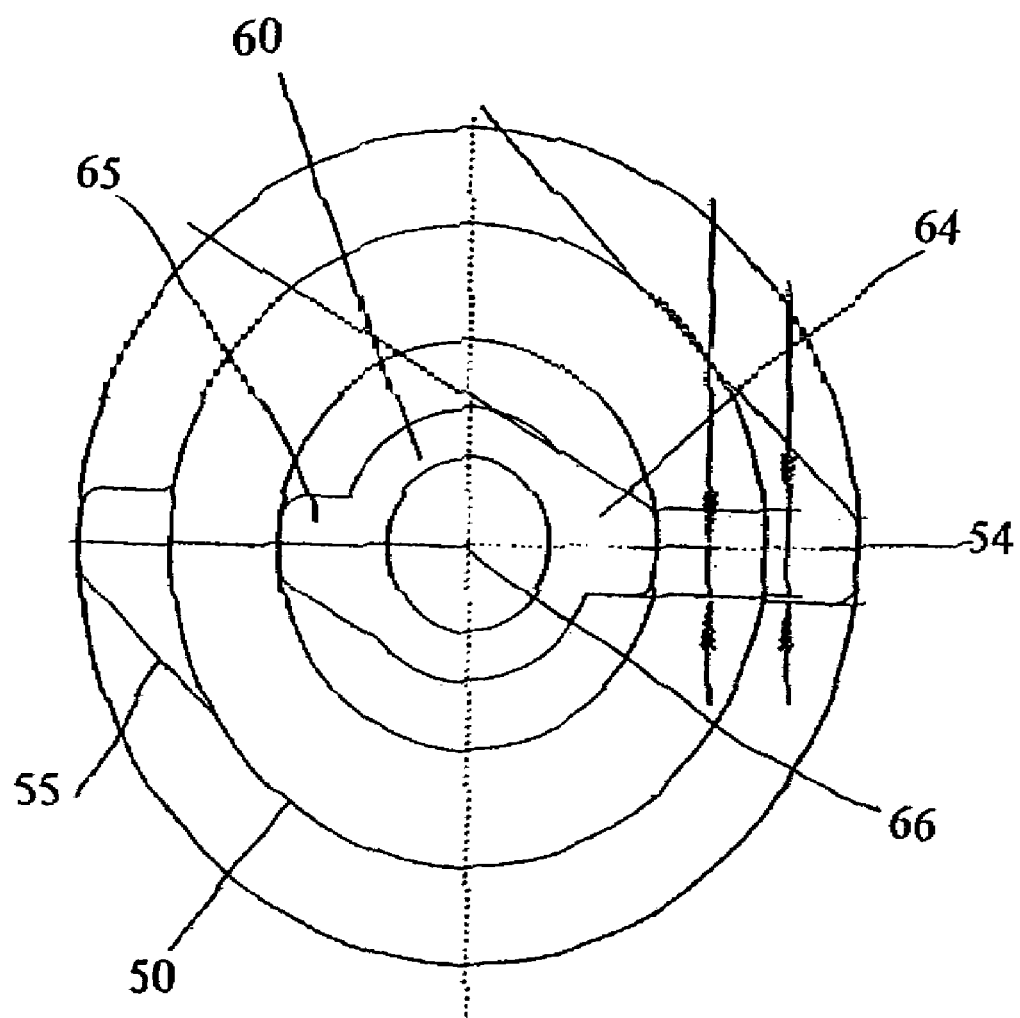
FIG. 8 is a schematic close up top view of the cartridge of the present invention.

FIG. 7 is a top view of the closure member of the cartridge. FIG. 8 is a close up schematic view of the closure member of the cartridge. As is best seen in FIG. 8, lower bosses 54 and upper bosses 64 project radially from a center axis of the cartridge.

Also visible on FIG. 8 are the configurations of the engaging face of each boss. The cartridge 10 is installed in the manifold 20 with a twisting motion which is a 90° quarter turn in the depicted embodiment. The engagement of the cartridge in the manifold by this motion is described in more detail below. As the cartridge 10 is twisted into its installed, seated position, the bosses 54 and 64 engage the intake and output stops, opening them as the cartridge is rotated into place. The engaging faces are slanted. As is best seen in FIG. 8, the engaging face 55 of lower boss 54 is at a different angle than at the engaging face 65 of upper boss 64. As will be readily appreciated by those with skill in the art, the steeper ramp, that is the engaging face which is at a more acute angle from the lateral horizontal axis depicted in FIG. 8, will engage and drive open the projection of a stop before the more gradual ramp opens its corresponding stop. The lower face 55 of lower boss 54 is the more gradual ramp. It is at a more oblique angle to the horizontal lateral axis of FIG. 8. Accordingly, rotation of the closure member 16 will open the top valve with boss 64 before the bottom valve is opened by boss 54. As depicted, installation of the cartridge will open the outlet first and inlet second upon installation. Conversely, the depicted closure member will close the inlet first and close the outlet second upon removal of the cartridge from the manifold.

Figure 10:
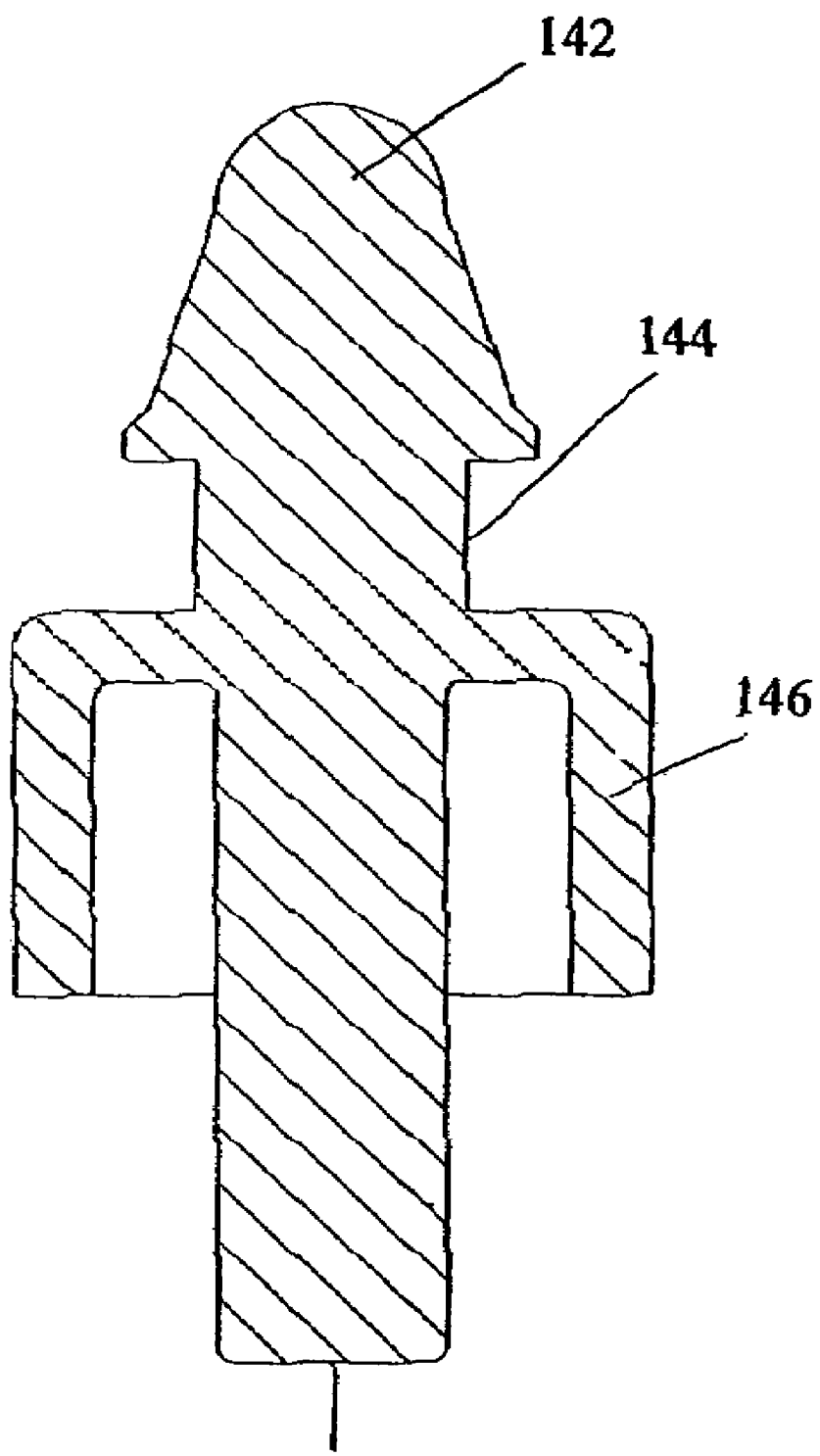
FIG. 10 is a cutaway side view close up of a stop valve for the present invention.

FIG. 10 is a close up, cross sectional view of the stop valve used for both the manifold inlet and outlet. It is comprised of a projecting head 142 which in the valves closed position extends into the manifold seat 26 or 28, where it is disposed to be engaged by bosses 54 or 64. The stop valve also includes an annular seat for an O-ring 144 in order to produce a water tight seal when closed. It also includes a spring seat 146 having a recess into which a coil spring is assembled. It is within the scope of the present invention that any stop, stop valve or check valve may be used, provided it extends into the seat recesses 26 or 28 in a manner that can be engaged by bosses 54 or 64 in order to open or close the valve upon rotation of the cartridge 10.

Figure 11:
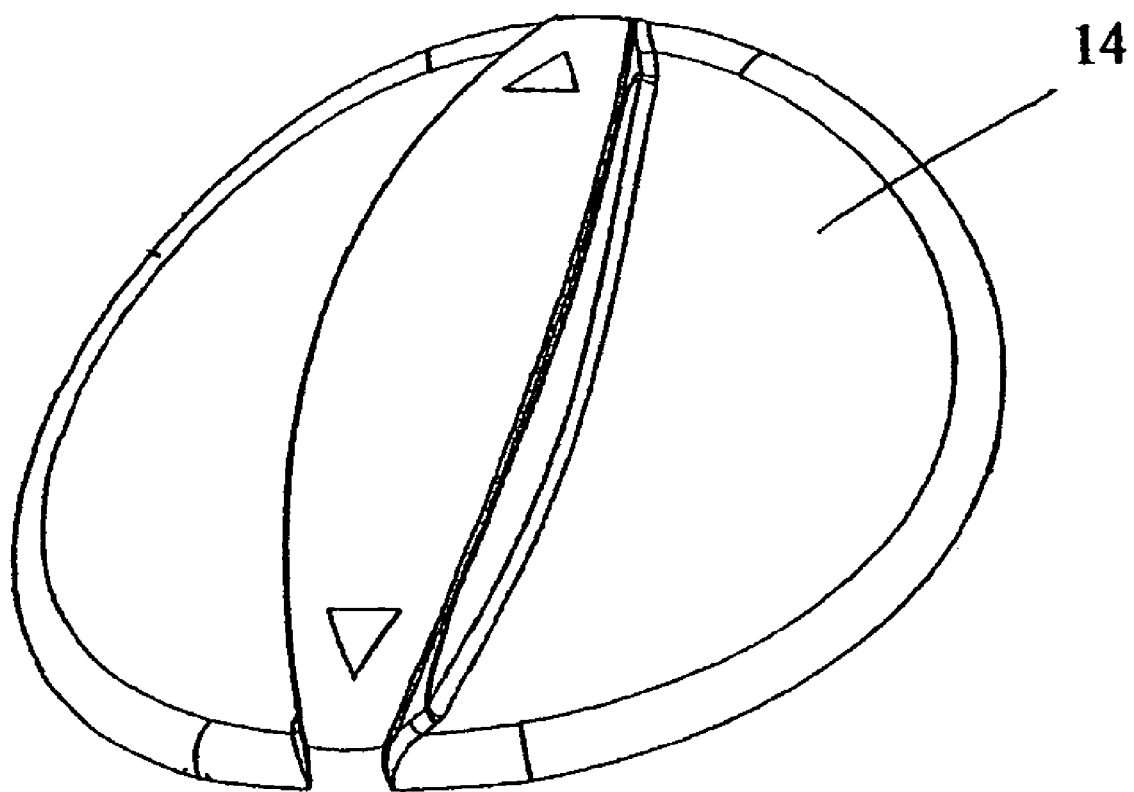
FIG. 11 is a perspective view of the base cap of the present invention.

FIG. 11 is a perspective view of the base cap for the cartridge. In one embodiment of the present invention, the base cap is fixedly attached to the bottom of the housing 12. The attachment may be by any manner, for example, by spin welding. In an alternative embodiment of the present invention, the base cap 14 is removable. In such an embodiment of the present invention a user would have the option of replacing the entire cartridge or in the alternative, removing the cartridge, opening the cartridge housing by removing the base cap 14 and replacing the filter 30. The base cap could then be replaced and the cartridge reinstalled with the new filter. This procedure may be desirable in order to replace the used filter, or change the filter element from one type to another. This alternative embodiment also has the possible advantages of economy, as a filter may cost less than a filter and cartridge together. It may also provide a user perceived ecologic advantage, since less material will be discarded if the only the filter, as opposed to the filter and cartridge together, are disposed of after use.

Figure 12:
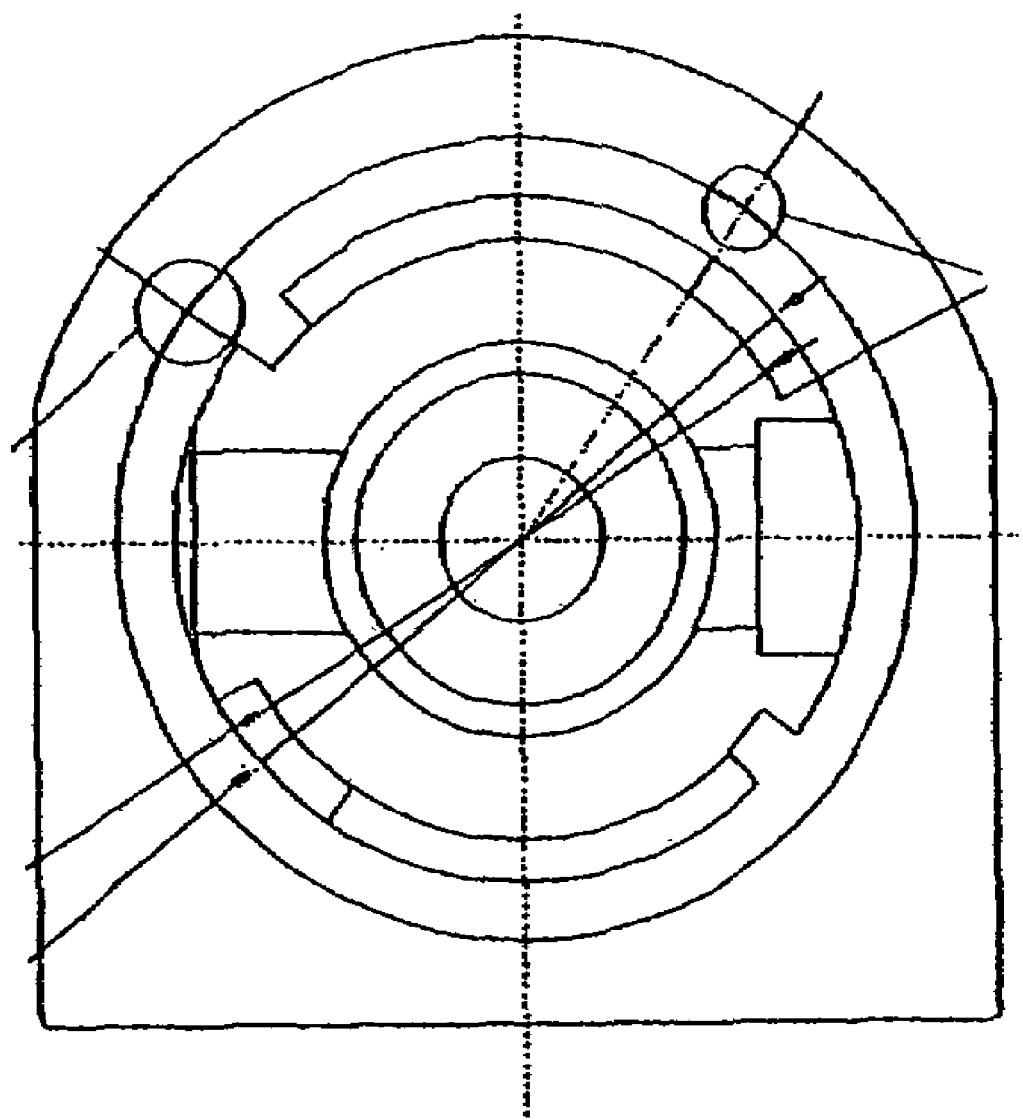
FIG. 12 is another view of the closure member.
Figure 13:
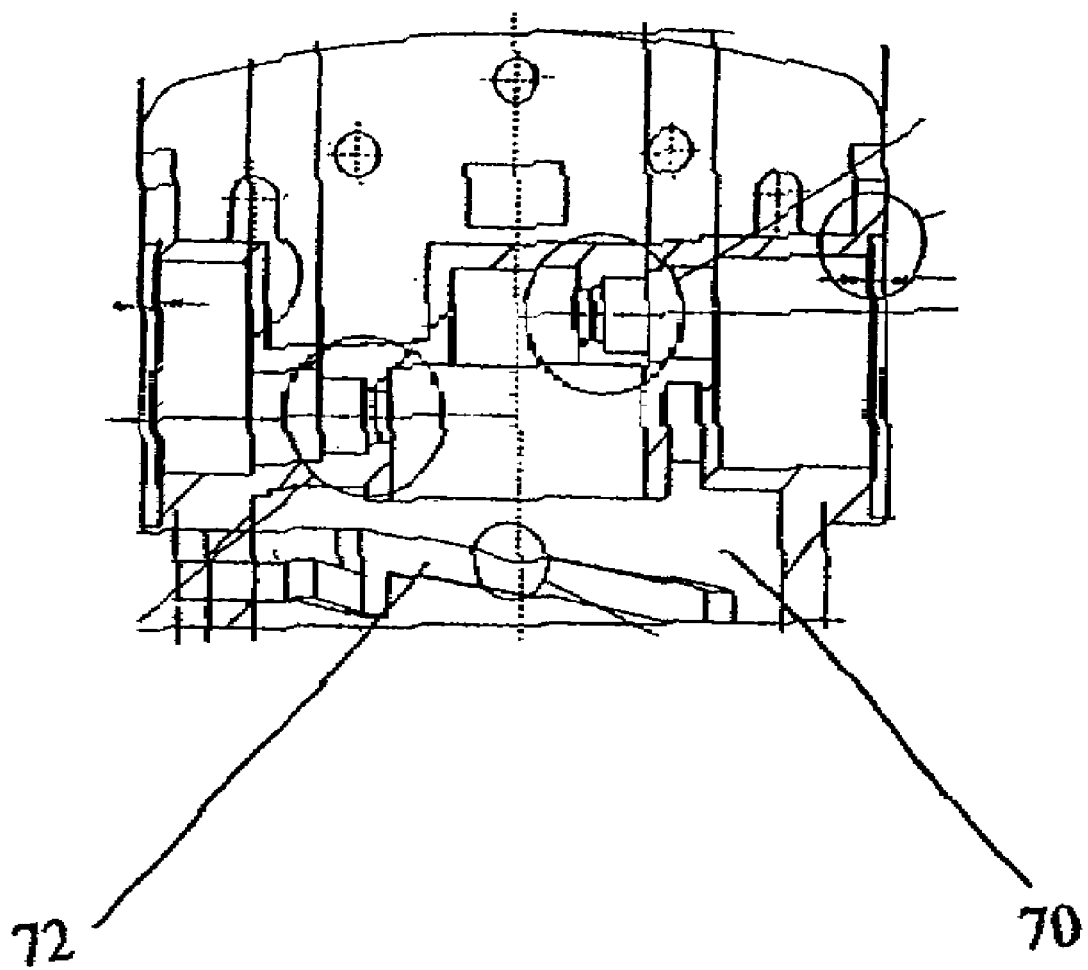
FIG. 13 is a side view of the closure member installed in the manifold.
Figure 14:
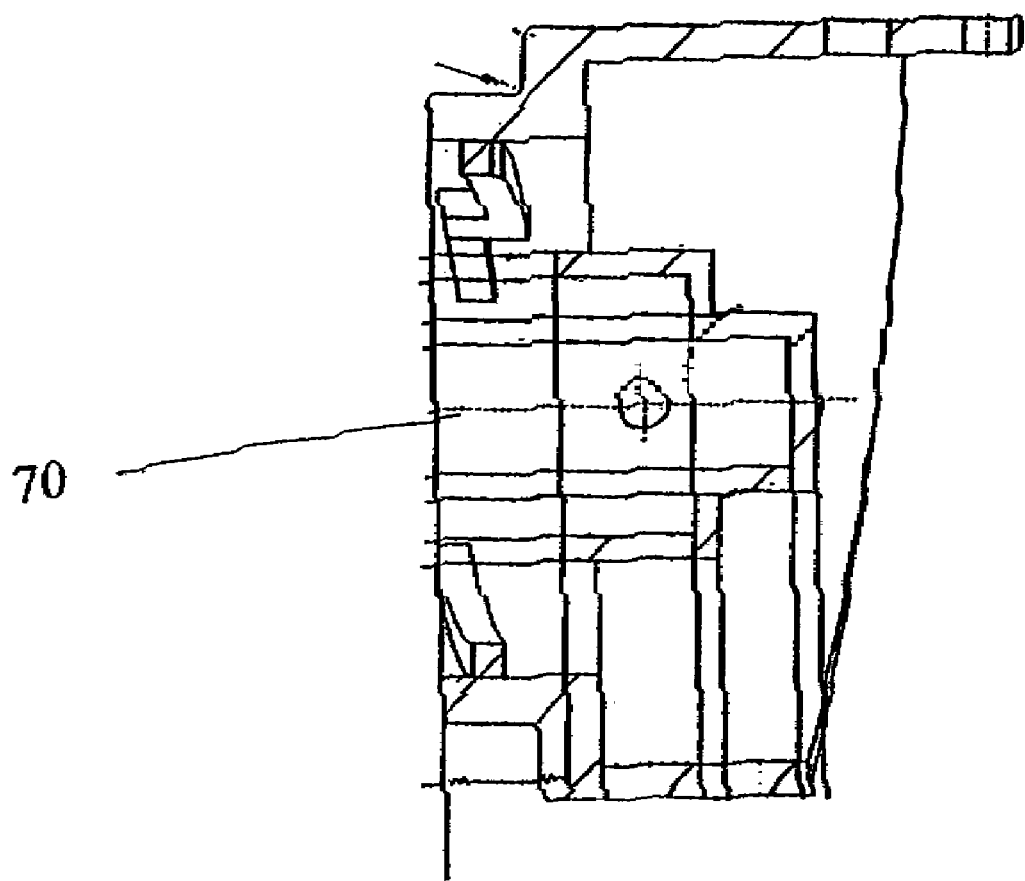
FIG. 14 is a cut away side view of the manifold.

The depicted embodiment of the present invention provides for a 90° twist turn movement for installing and removing the cartridge 10 into and from the manifold 20. Other degrees of rotation or other means of installation are within the scope of the present invention, provided that the closure member engages the stop valves sequentially. In the depicted embodiment, as is best seen in FIGS. 12, 13 and 14, angled threads or lugs are formed within a mounting recess 70 in manifold 20. Thread lugs 72 in the recess of manifold 20 correspond to cooperating thread lugs 74 on the closure member of the cartridge.

The ramped or threaded lugs 72 and 74 on the closure member and mounting recess are dimensioned to engage each other in close sliding cooperation. They also include an end stop on either or both lugs. Finally, either one or the other of ramped lugs 72 or 74 will have a boss, positioned to engage a detent on the other of threaded ramps 72 or 74. The boss and detent are aligned to engage when the cartridges properly installed and fully closed and mounted in the manifold. The boss and detent provide a positive "snap in" feel to the user indicating that the cartridge is properly installed and further and manipulation by the user is not necessary.

Figure 15:
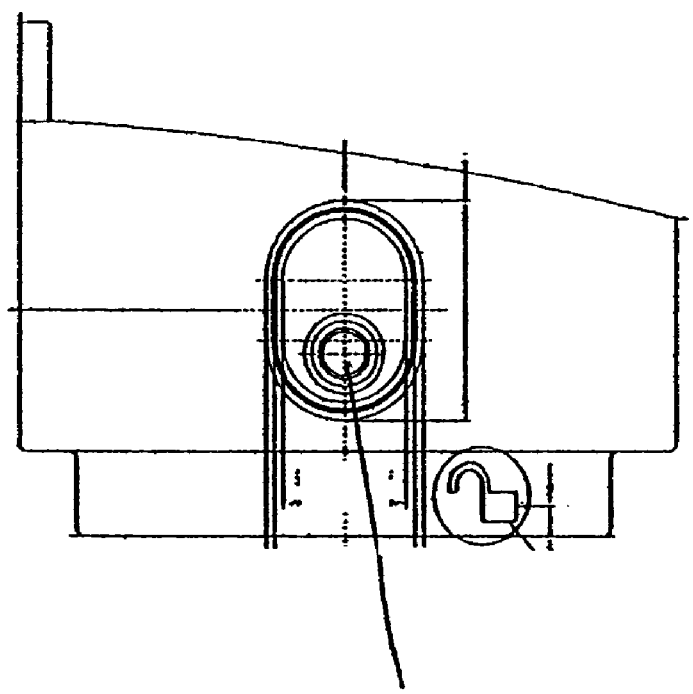
FIG. 15 is a side view of the manifold.
Figure 16:
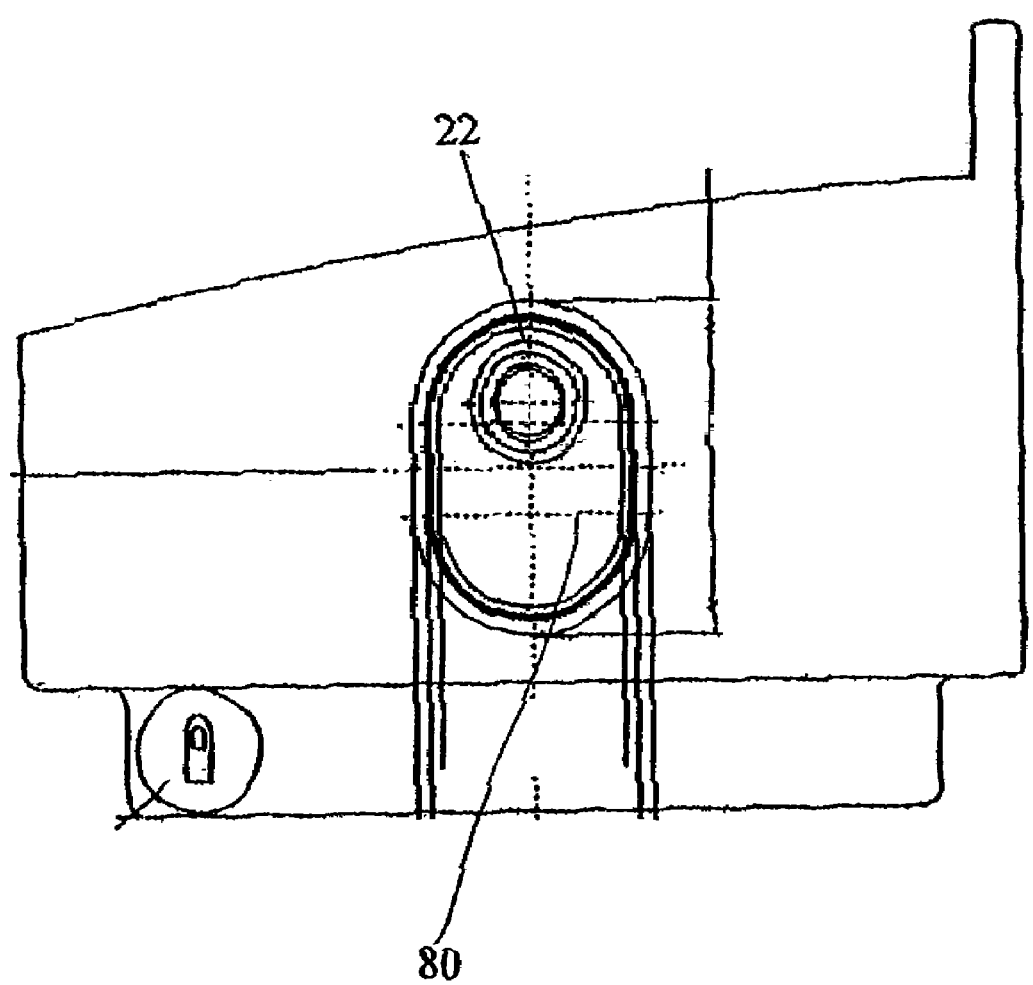
FIG. 16 is an opposite side view of the manifold.

FIGS. 15 and 16 are side views of the manifold 20. They show inlet 22 and outlet 24. In order to ease installation of the manifold and to make it compatible with most existing plumbing systems, offset oval inserts 80 receive parallel installation of an inline pipe and direct the fluid flow to or from that pipe to properly engage the inlet and outlet of the manifold.

In one embodiment of the present invention, a fluid filter has a fluid filter comprising a manifold having a fluid inlet with an inlet stop and a fluid outlet with an outlet stop and having a cartridge seat; a cartridge, the cartridge being separable from the manifold and adapted to mount and dismount in the manifold, the cartridge having a filter housing containing a filter for filtering fluid, the cartridge also having an integral closure member having a first level and a second level; a radial inlet port on a face of the first level of the closure member, the radial inlet port being in fluid communication with the fluid inlet of the manifold when the cartridge is mounted in the manifold; an axial outlet port on a top of said second level of the closure member, the axial outlet port being in fluid communication with the fluid outlet of the manifold when the cartridge is mounted in the manifold; a first boss on the closure member, the first boss being disposed to open the inlet stop when the cartridge is mounted in the manifold; a second boss on the closure member, the second boss being disposed to open the outlet stop when the cartridge is mounted in the manifold; and wherein the bosses engage the stops sequentially. The first and second levels may be stepped. The bosses may be in pairs, which may be opposed by about 180°. The fluid filter may have ramped lugs on the manifold and on the cartridge, the ramp lugs being disposed to slidingly cooperate for rotational mounting. The ramped lugs may include a boss and detent which engage one another upon completed mounting of the cartridge in the manifold. The second level may have a radius less than a radius of the first level. The first and second bosses may be disposed to open the outlet stop before opening the inlet stop upon mounting the cartridge in the manifold. The first boss may have an engaging face at a different angle than an engaging face of the second boss. The first boss may have a different radial length than the second boss. The second boss may be placed at a different radial position on the second level relative to a placement of the first boss on the first level. The stops may be assembled with compression springs of different strengths. The radial inlet port may be larger than the axial outlet port. The fluid filter may compromise at least one seal, which may be an O-ring. The fluid filter has a fluid tight seal disposed to seal the manifold and the cartridge from fluid leakage before either of the inlet stop or the outlet stop is engaged. The inlet port may be sealed from fluid communication with the outlet port.

In view of the foregoing, it will be seen that the several advantages of the invention are achieved and attained.

The embodiments were chosen and described in order to best explain the principles of the invention and its practical application to thereby enable others skilled in the art to best utilize the invention in various embodiments and with various modifications as are suited to the particular use contemplated.

As various modifications could be made to the exemplary embodiments, as described above with reference to the corresponding illustrations, without departing from the scope of the invention it is intended that all matter contained in the foregoing description and shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

What is claimed is:

1. A fluid filter comprising:
   a manifold having a fluid inlet with an inlet stop and a fluid outlet with an outlet stop and having a cartridge seat;
   a cartridge, said cartridge being separable from said manifold and adapted to mount and dismount in said manifold, said cartridge having a filter housing containing a filter for filtering fluid, said cartridge also having an integral closure member;
   an inlet port in said closure member, said inlet port being in fluid communication with said fluid inlet of said manifold when said cartridge is mounted in said manifold;
   an outlet port in said closure member, said outlet port being in fluid communication with said fluid outlet of said manifold when said cartridge is mounted in said manifold;
   a first boss on said closure member, said first boss being disposed to open said inlet when said cartridge is mounted in said manifold;
   a second boss on said closure member, said second boss being disposed to open said outlet when said cartridge is mounted in said manifold; and
   wherein said bosses engage said inlet and said outlet sequentially.

2. The fluid filter of claim 1 wherein said bosses are in pairs.

3. The fluid filter of claim 2 wherein said pairs are opposed by about 180°.

4. The fluid filter of claim 1 further comprising ramped tugs on said manifold and on said cartridge, said ramp lugs being disposed to slidingly cooperate for rotational mounting.

5. The fluid filter of claim 4 wherein said ramped tugs include a boss and detent which engage one another upon completed mounting of said cartridge in said manifold.

6. The fluid filter of claim 1 wherein said first and second bosses are disposed to close said inlet stop before closing said outlet stop upon removal of said cartridge from said manifold.

7. The fluid filter of claim 1 wherein said first and second bosses are disposed to open said outlet stop before opening said inlet stop upon mounting said cartridge in said manifold.

8. The fluid filter of claim 1 wherein said first boss has an engaging face at a different angle than an engaging face of said second boss.

9. The fluid filter of claim 1 wherein said first boss has a different radial length than said second boss.

10. The fluid filter of claim 1 wherein said second boss is placed at a different radial position on said second level relative to a placement of said first boss on said first level.

11. The fluid filter of claim 1 wherein said stops are assembled with compression springs of different strengths.

12. The fluid filter of claim 1 wherein said inlet port is larger than said outlet port.

13. The fluid filter of claim 1 further comprising at least one seal.

14. The fluid filter of claim 13 wherein said seal is an O-ring.

15. The fluid filter of claim 1 further comprising a fluid tight seal disposed to seal said manifold and said cartridge from fluid leakage before either of said inlet stop or said outlet stop is engaged.

16. The fluid filter of claim 1 wherein said inlet port is sealed from fluid communication with said outlet port.

* * * * *